United States Patent
Ayirala et al.

(10) Patent No.: US 10,988,673 B2
(45) Date of Patent: Apr. 27, 2021

(54) POLYMER FLOODING PROCESSES FOR VISCOUS OIL RECOVERY IN CARBONATE RESERVOIRS

(71) Applicant: Saudi Arabian Oil Company, Dhahran (SA)

(72) Inventors: Subhash Chandrabose Ayirala, Dhahran (SA); Abdulkareem M. Al-Sofi, Dhahran (SA); Ali Abdallah Al-Yousef, Dhahran (SA); Jinxun Wang, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 16/557,297

(22) Filed: Aug. 30, 2019

(65) Prior Publication Data

US 2019/0382647 A1    Dec. 19, 2019

Related U.S. Application Data

(62) Division of application No. 15/358,449, filed on Nov. 22, 2016, now Pat. No. 10,457,851.

(60) Provisional application No. 62/280,446, filed on Jan. 19, 2016.

(51) Int. Cl.
| | |
|---|---|
| *C09K 8/588* | (2006.01) |
| *C08K 3/00* | (2018.01) |
| *E21B 43/20* | (2006.01) |

(52) U.S. Cl.
CPC ............. *C09K 8/588* (2013.01); *C08K 3/00* (2013.01); *E21B 43/20* (2013.01)

(58) Field of Classification Search
None
See application file for complete search history.

(56) References Cited

U.S. PATENT DOCUMENTS

| | | | |
|---|---|---|---|
| 3,330,343 A | 7/1967 | Tosch et al. | |
| 3,346,047 A | 10/1967 | Townsend et al. | |
| (Continued) | | | |

FOREIGN PATENT DOCUMENTS

| | | |
|---|---|---|
| CN | 103242818 A | 8/2013 |
| CN | 103965852 A | 8/2014 |
| (Continued) | | |

OTHER PUBLICATIONS

Alzayer, et al. "Numerical simulation of improved heavy oil recovery by low-salinity water injection and polymer flooding." SPE 165287, SPE Saudi Arabia section technical symposium and exhibition. Society of Petroleum Engineers, 2013; pp. 1-13.
(Continued)

*Primary Examiner* — Jeffrey D Washville
(74) *Attorney, Agent, or Firm* — Bracewell LLP; Constance R. Rhebergen

(57) ABSTRACT

A composition for use in a polymer flooding operation in a viscous oil containing carbonate reservoir formation with in situ rock is provided. The composition includes a polymer, the polymer operable to increase the viscosity of the composition; and a smart water, the smart water operable to alter a wettability of the in situ rock, wherein the smart water has a total dissolved solids of between 5,000 ppm and 7,000 ppm, wherein the total dissolved solids comprises one or more salts; wherein the composition has a viscosity between 4 cP and 100 cP.

5 Claims, 2 Drawing Sheets

(56) References Cited

U.S. PATENT DOCUMENTS

| | | | |
|---|---|---|---|
| 3,508,612 | A | 4/1970 | Reisberg et al. |
| 3,603,400 | A | 9/1971 | Son, Jr. |
| 3,687,199 | A | 8/1972 | Jennings |
| 3,827,499 | A | 8/1974 | Norton et al. |
| 3,908,764 | A * | 9/1975 | Harvey .................. E21B 43/20 166/305.1 |
| 4,008,767 | A * | 2/1977 | Waite ..................... C09K 8/845 166/400 |
| 4,050,513 | A | 9/1977 | Wu |
| 4,074,755 | A | 2/1978 | Hill et al. |
| 4,137,182 | A | 1/1979 | Golinkin |
| 4,250,961 | A | 2/1981 | Morse et al. |
| 4,630,678 | A | 12/1986 | Mumallah |
| 4,762,178 | A | 8/1988 | Falls et al. |
| 4,785,028 | A | 11/1988 | Hoskin |
| 4,915,170 | A | 4/1990 | Hoskin |
| 6,325,147 | B1 | 12/2001 | Doerler et al. |
| 7,581,594 | B2 | 9/2009 | Tang |
| 8,191,416 | B2 | 6/2012 | Kuchuk |
| 8,230,922 | B2 | 7/2012 | Pich |
| 8,439,111 | B2 | 5/2013 | Collins et al. |
| 8,550,163 | B2 | 10/2013 | Al-Yousif et al. |
| 8,550,164 | B2 | 10/2013 | Al-Yousef |
| 8,869,892 | B2 | 10/2014 | Pone |
| 8,921,294 | B2 | 12/2014 | Matharu |
| 8,951,954 | B2 | 2/2015 | Kron et al. |
| 10,590,329 | B2 | 3/2020 | Ayirala et al. |
| 10,590,330 | B2 | 3/2020 | Ayirala et al. |
| 2006/0027363 | A1* | 2/2006 | Shpakoff ................ C09K 8/584 166/270.1 |
| 2009/0148342 | A1 | 6/2009 | Bromberg et al. |
| 2010/0078168 | A1* | 4/2010 | Jackson .................. C09K 8/588 166/270.1 |
| 2011/0306525 | A1 | 12/2011 | Lighthelm et al. |
| 2012/0125605 | A1 | 5/2012 | Willingham et al. |
| 2013/0081822 | A1* | 4/2013 | Han ....................... C09K 8/588 166/369 |
| 2013/0125630 | A1 | 5/2013 | Collins |
| 2013/0274149 | A1 | 10/2013 | Lafitte |
| 2014/0232275 | A1 | 8/2014 | Kwon et al. |
| 2014/0262275 | A1 | 9/2014 | Dean et al. |
| 2014/0326458 | A1 | 11/2014 | Favero et al. |
| 2014/0345862 | A1 | 11/2014 | Jerauld et al. |
| 2015/0075795 | A1 | 3/2015 | Wheeler |
| 2015/0233222 | A1 | 8/2015 | Teklu et al. |
| 2015/0233223 | A1 | 8/2015 | Alameri et al. |
| 2016/0032170 | A1 | 2/2016 | Li et al. |
| 2016/0040057 | A1 | 2/2016 | Favero et al. |
| 2017/0058186 | A1 | 3/2017 | Oghena et al. |
| 2017/0058187 | A1 | 3/2017 | Mansour |
| 2017/0204322 | A1 | 7/2017 | Ayirala et al. |
| 2019/0382647 | A1 | 12/2019 | Ayirala et al. |
| 2020/0172793 | A1 | 6/2020 | Ayirala et al. |
| 2020/0172794 | A1 | 6/2020 | Ayirala et al. |

FOREIGN PATENT DOCUMENTS

| | | |
|---|---|---|
| GB | 1484153 A | 9/1977 |
| JP | 2011046612 A | 3/2011 |
| WO | 2008029131 A1 | 3/2008 |
| WO | 2010092097 A1 | 8/2010 |
| WO | 2011113470 A1 | 9/2011 |
| WO | 2013091023 A2 | 6/2013 |
| WO | 2013117741 A1 | 8/2013 |
| WO | 2013156866 A2 | 10/2013 |

OTHER PUBLICATIONS

Austad, Tor. "Water-based EOR in carbonates and sandstones: new chemical understanding of the EOR potential using smart water." Enhanced oil recovery Field case studies (2013); pp. 1-49.

Awolayo, et al. "An Experimental Investigation into the Impact of Sulfate Ions in Smart Water to Improve Oil Recovery in Carbonate Reservoirs." Transport in Porous Media 111.3 (2016); pp. 649-668.

Ayirala et al., "A Designer Water Process for Offshore Low Salinity and Polymer Flooding Applications", SPE 129926, SPE Improved Oil Recovery Symposium held in Oklahoma, 2010; pp. 1-12.

Hassenkam et al., "A Fast Alternative to Core Plug Tests for Optimizing Injection Water Salinity for EOR" SPE 169136-MS, SPE Improved Oil Recovery Symposium held in USA, Apr. 2014; pp. 1-15.

Hosseini, S. N., et al. "Brine Ions and Mechanism of Low Salinity Water Injection in Enhanced Oil Recovery: A Review." Research Journal of Applied Sciences, Engineering and Technology 11.11 (2015); pp. 1257-1264.

International Search Report and Written Opinion for related PCT application PCT/US2017/014097 (SA5516/PCT) dated Mar. 16, 2017; pp. 1-16.

International Search Report and Written Opinion for related PCT application PCT/US2017/014099 (SA5449/PCT) dated Mar. 10, 2017; pp. 1-14.

Kumar, et al., "Atomic Force Microscopy Study of Wettability Alteration," SPE International Symposium on Oilfield Chemistry, The Woodlands, TX, Feb. 2005; pp. 137-145.

Kwak, et al. "New insights on the role of multivalent ions in water-carbonate rock interactions." SPE Improved Oil Recovery Symposium. Society of Petroleum Engineers, Saudi Aramco Journal of Technology 2014; pp. 1-14.

Lashkarbolooki et al., "Effect of Salinity, Resin and Asphaltene on the Surface Properties of Acidic Crude Oil/ Smart Water/Rock System", Energy & Fuels Oct. 23, 2014; pp. 1-42.

Lashkarbolooki, et al. "The Impacts of Aqueous Ions on Interfacial Tension and Wettability of an Asphaltenic-Acidic Crude Oil Reservoir during Smart Water Injection." Journal of Chemical & Engineering Data 59.11 (2014); pp. 1-11.

Mohammadi et al., "Mechanistic Modeling of the Benefit of Combining Polymer with Low Salinity Water for Enhanced Oil Recovery" SPE 153161, SPE Improved Oil Recovery Symposium held in Oklahoma, 2012; pp. 1-11.

Qiao, C. et al. "A Mechanistic Model for Wettability Alteration by Chemically Tuned Waterflooding in Carbonate Reservoirs." SPE 170966, SPE Journal (2015); pp. 1-25.

Rezaeidoust, A., et al. "Smart Water as Wettability Modifier in Carbonate and Sandstone: A Discussion of Similarities/Differences in the Chemical Mechanisms." Energy & fuels 2009, 23; pp. 4479-4485.

Sharifpour, et al. "Smart Technique in Water Shutoff Treatment for a Layered Reservoir through an Engineered Injection/Production Scheme." Industrial & Engineering Chemistry Research 54.44 (2015); pp. 1-12.

Shiran et al., "Enhanced Oil Recovery (EOR) by Combined Low Salinity Water / Polymer Flooding", ACS Energy & Fuels, American Chemical Society, vol. 27, 2013, pp. 1223-1235.

Suijkerbuijk et al., "The Development of a Workflow to Improve Predictive Capability of Low Salinity Response" IPTC 17157, International Petroleum Technology Conference held in China, 2013, pp. 1-11.

Suman et al. "Evaluation of Low Saline "Smart Water" Enhanced Oil Recovery in Light Oil Reservoirs". World Journal of Engineering and Technology, 2, (2014); pp. 13-22.

Vermolen et al., "Low Salinity Polymer Flooding: Improving Polymer Flooding Technical Feasibility and Economics by Using Low Salinity Make up Brine", IPTC 17342, International Petroleum Technology Conference held in Qatar, 2014; pp. 1-15.

Yousef et al., "Improved /Enhanced Oil Recovery from Carbonate Reservoirs by Tuning Injection Water Salinity and Ionic Content", SPE154076, Eighteenth SPE Improved Oil Recovery Symposium held in USA, Apr. 2012; pp. 1-18.

Yousef et al., "Laboratory Investigation of the Impact of Injection Water Salinity and Ionic Content on Oil Recovery From Carbonate Reservoirs" SPE137634, SPE Canadian Unconventional Resources and International Petroleum Conf. Canada, 2010; pp. 578-593.

(56) References Cited

OTHER PUBLICATIONS

Yousef, A. et al. "The impact of the injection water chemistry on oil recovery from carbonate reservoirs" SPE 154077, SPE EOR Conference at Oil and Gas West Asia. Society of Petroleum Engineers, 2012; pp. 1-14.

Zekri, A., et al. "An Experimental Investigation of Low Salinity Oil Recovery in Carbonate and Sandstone Formation" International Journal of Petroleum and Petrochemical Engineering (IJPPE); vol. 1, Issue 1, Jun. 2015, pp. 1-11.

Zhuoyan et al., "Evaluation of the Potential of High Temperature, Low Salinity Polymer Flood for the Gao-30 Reservoir in the Huabei Oilfield, China: Experimental and Reservoir Simulation Results", Offshore technology Conference held in Texas, 2015, Pages.

Achinta et al., "Application of nanotechnology by means of nanoparticles and nanodispersions in oil recovery—A Comprehensive review", Journal of Natural Gas Science and Engineering, 2016, pp. 1284-1309, Elsevier.

Arezoo et al., "An experimental study of nanoparticle-polymer-stabilized CO2 foam", Colloids and Surfaces A, 2017, pp. 17-27, Elsevier.

International Search Report and Written Opinion for International Application No. PCT/US2019/050881 (SA51010) report dated Nov. 15, 2019; pp. 1-13.

* cited by examiner

POLYMER FLOODING PROCESSES FOR VISCOUS OIL RECOVERY IN CARBONATE RESERVOIRS

CROSS-REFERENCE TO RELATED APPLICATION

This application claims priority from U.S. Non-Provisional application Ser. No. 15/358,449, filed Nov. 22, 2016, and titled "IMPROVED POLYMER FLOODING PROCESSES FOR VISCOUS OIL RECOVERY IN CARBONATE RESERVOIRS," which claims priority from U.S. Provisional Application No. 62/280,446, filed Jan. 19, 2016, and titled "IMPROVED OIL RECOVERY PROCESS USING AN OIL RECOVERY COMPOSITION OF SMART WATER AND DILUTE POLYMER FOR CARBONATE RESERVOIRS." For purposes of United States patent practice, this application incorporates the contents of both the Provisional Application and Non-Provisional Application by reference in their entirety.

BACKGROUND OF THE INVENTION

Field of the Invention

This invention relates to methods and compositions for polymer flooding operations. More specifically, the invention relates to methods and compositions using smart water and polymers for polymer flooding operations in carbonate reservoirs.

Description of the Related Art

Polymer flooding processes are one of the matured enhanced oil recovery (EOR) technologies and are currently gaining some importance for viscous oil recovery in carbonate reservoirs. Increased aqueous phase viscosities due to polymer addition decrease the mobility of injection water to provide some mobility control and mitigate viscous fingering with such crude oils in the displacement process. Polyacrylamide based polymers or co-polymers are the most widely employed polymers for EOR today in the industry. These polymers are anionic in nature and their viscosifying characteristics are hindered by salinity and the monovalent/divalent cations present in the makeup water. The negative carboxyl groups of partially hydrolyzed EOR polymers interact strongly with positively charged ions such as monovalent and divalent cations present in the makeup water. These salt ions bind tightly to the negatively charged carboxyl groups in the polymer chain to render a "coiled state" and prevent the elongation/swelling of polymer molecules in water for increased viscosibility. The divalent cations are much more detrimental when compared to monovalent cations due to their strong bridging effect with polymer chain and they can precipitate polymer from solution even at relatively lower ionic concentrations. As a result, EOR processes that employ high salinity water/seawater typically need much higher dosages of polymer as compared to low salinity water to achieve decent viscosities required for proper mobility control in viscous oil recovery processes. Therefore, the use of high salinity water is typically limited to situations in which the availability of high salinity water, such as seawater, is readily available. Such requirements of high polymer dosage can become cost prohibitive to apply polymer flooding technology in certain formations containing viscous crude oils.

In addition, the formation temperatures and in-situ water composition can impact the type of polymer chosen for EOR.

In conventional polymer flooding operations, the polymer concentration is typically 1000 ppm or greater in the injection fluid. The injection fluid is typically injected as a finite slug of at least 0.3 pore volumes for processes involving carbonate reservoirs and viscous oil recovery.

SUMMARY OF THE INVENTION

This invention relates to methods and compositions for polymer flooding operations. More specifically, the invention relates to methods and compositions using smart water and polymers for polymer flooding operations in carbonate reservoirs.

A first aspect of a composition for use in a polymer flooding operation in a viscous oil containing carbonate reservoir formation with in situ rock is provided. The composition includes a polymer, the polymer operable to increase the viscosity of the composition, and a smart water, the smart water operable to alter a wettability of the in situ rock. The smart water has a total dissolved solids of between 5,000 ppm and 7,000 ppm, the total dissolved solids comprises a salt, and the composition has a viscosity between 4 cP and 100 cP.

In certain aspects, the polymer comprises a copolymer of acrylamide and acrylate. In certain aspects, the polymer comprises a copolymer of acrylamide and acrylamide tertiary butyl sulfonate (ATBS). In certain aspects, the salt can be selected from the group consisting of sodium chloride, calcium chloride, magnesium chloride, sodium sulfate, magnesium sulfate, sodium bicarbonate, and combinations thereof. In certain aspects, the smart water comprises 300 ppm or less of divalent cations. In certain aspects, the smart water comprises 400 ppm or greater divalent anions. In certain aspects, the polymer is present in an amount between 1,000 ppm by weight and 3,000 ppm by weight.

In a second aspect, a method of recovering an oil from a carbonate reservoir formation is provided. The method includes the steps of injecting a smart water/polymer slug into the carbonate reservoir formation, where the smart water/polymer slug includes a smart water and a polymer, allowing the smart water/polymer slug to alter the wettability of the carbonate reservoir formation, and injecting a seawater chase, where the seawater chase is operable to recover the oil from the carbonate reservoir formation.

In certain aspects, the method further includes the step of injecting a smart water slug into the carbonate reservoir formation after the step of allowing the smart water/polymer slug to alter the wettability of the carbonate reservoir formation. In certain aspects, the method further includes the step of injecting one or more tapered smart water/polymer plugs into the carbonate reservoir formation after the step of allowing the smart water/polymer slug to alter the wettability of the carbonate reservoir formation. In certain aspects, the smart water/polymer slug has a volume of at least 0.3 pore volumes. In certain aspects, the oil is a viscous oil. In certain aspects, the oil is a heavy oil. In certain aspects, the smart water wherein the smart water has a total dissolved solids of between 5,000 ppm and 7,000 ppm, wherein the total dissolved solids comprises a salt. In certain aspects, the smart water/polymer slug has a viscosity between 4 cP and 100 cP.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 1:
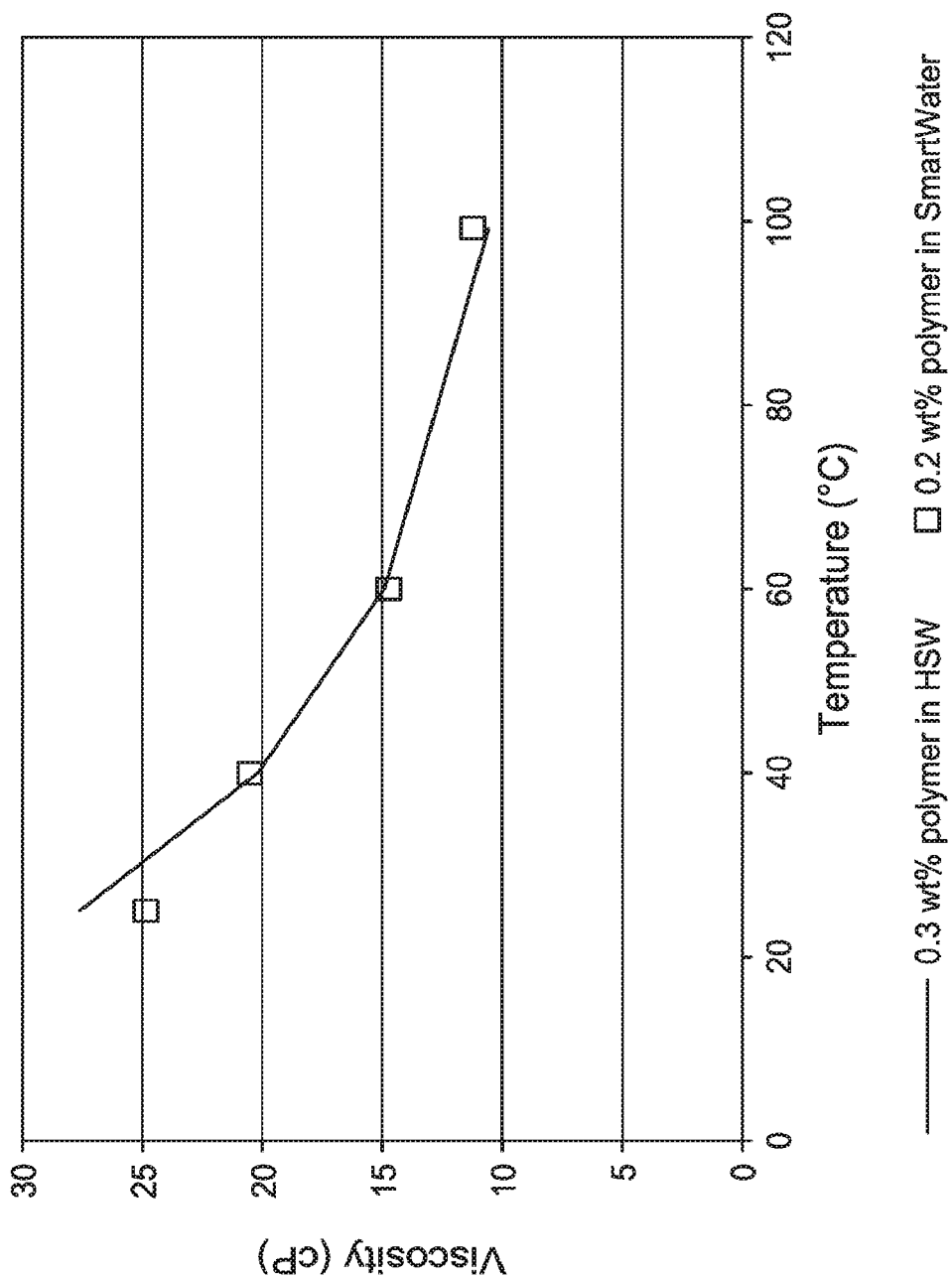
FIG. 1 is a graphical comparison of viscosity versus temperature for the two different compositions of Example 1.

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

The present invention is directed to compositions and methods related to the use of smart water and polymers. The compositions and methods of the present invention can be used in polymer flooding processes involving viscous oil recovery in carbonate reservoirs. Advantageously, the compositions and methods described herein lower the required polymer concentration by up to 50% due to the lower salinity and specific ionic composition of the smart water. The specific ionic composition favorably interacts with the in-situ rock and fluids, including crude oil and formation water, of the carbon reservoir to alter the wettability of the in-situ rock and improve microscopic sweep efficiency at the pore scale. In addition, the lower salinity and specific ion composition can increase the viscosifying characteristics of the polymer resulting in a reduction in the polymer concentration required as compared to conventional polymer flooding fluids, such as seawater. Advantageously, the polymer provides better mobility control of the smart water, which increases macroscopic sweep efficiency. Advantageously, the compositions and methods of the present invention have a synergy that results in additional incremental oil recovery (up to 5 to 10%). Advantageously, the compositions and methods of the present invention exhibit improved efficiency and economics due to lower polymer volume compared to conventional polymer flooding process used for viscous oil recovery in carbonate reservoirs.

As used herein, "smart water" refers to an injection water of tuned water chemistry; tuned in terms of both salinity and specific individual ion compositions. In at least one embodiment, smart water is a lower salinity water containing between about 5,000 ppm and 7,000 ppm TDS, 300 ppm or less of the total amount of divalent cations and 400 ppm or greater of the total amount of divalent anions. In at least one embodiment, the divalent anion is sulfates, such that the smart water contains 400 ppm or greater sulfates. The viscosity of smart water at surface conditions can be in the range of between about 0.9 cP and 1.0 cP. The viscosity of smart water at carbonate reservoir conditions, such as temperatures at about 100° C., can be in the range between about 0.2 cP and 0.3 cP. In at least one embodiment, smart water can be prepared by diluting seawater with fresh water. In at least one embodiment, the smart water is in the absence of external compounds or additives, other than the TDS and ions specified above.

Depletion of monovalent ions and enrichment of divalent ions is desired in a smart water. In at least one embodiment, higher amounts of sulfates and lower amounts of both monovalent cations and divalent cations are preferred in a smart water for polymer floods so as to advantageously minimize the interaction of positively charged ions with negative carboxyl groups present in the polymer. Carbonate surfaces typically exhibit a positive charge at formation water salinities, composition and pH at reservoir conditions. The negative carboxylic acid groups of crude oil are attached to the carbonate rock surface. Without being bound to a particular theory, the mechanism can be understood as follows. Initially, sulfate ions adsorb on the in situ rock surface to reduce the attraction of the surface to the negatively charged carboxylic groups in crude oil. The calcium ions further reduce this attraction by bonding to the oil side of the interface. The calcium ions are later substituted by magnesium ions due to the increasing reactivity of these ions at higher temperatures. These favorable ion interactions at the rock surface change the wettability of the in situ rock towards intermediate-wet or water-wet state to release oil from the pores of reservoir rock. The presence of non-active monovalent ions can prevent the accessibility of the divalent ions to interact at the in situ rock surface thereby reducing the effectiveness of the process. Therefore, it is advantageous to provide an injection fluid with a reduced amount of monovalent ions.

As used herein, "seawater" refers to a high salinity water on the order of about 35,000 ppm to 56,000 ppm TDS that includes significant amounts of divalent cations.

Table 1 shows a comparison of a typical seawater to a representative smart water.

TABLE 1

| Seawater and Smart Water Compositions | | |
|---|---|---|
| Ions | Seawater (ppm) | Smart Water (ppm) |
| Sodium ($Na^+$) | 18,300 | 1,824 |
| Calcium ($Ca^{2+}$) | 650 | 65 |
| Magnesium ($Mg^{2+}$) | 2,110 | 211 |
| Sulfate ($SO_4^{2-}$) | 4,290 | 429 |
| Chloride ($Cl^-$) | 32,200 | 3,220 |
| Bicarbonate ($HCO_3^-$) | 120 | 12 |
| TDS | 57,670 | 5,761 |

As used herein, "divalent ions" includes, but is not limited to calcium, magnesium, and sulfate. As will be understood by one of the art, calcium and magnesium are cations.

As used herein, "monovalent ions" includes, but is not limited to, sodium and chloride.

The monovalent ions and divalent ions can be present in the form of salts. The smart water can include one or more salts. Examples of salts useful in the present invention can include sodium chloride (NaCl), calcium chloride ($CaCl_2$), magnesium chloride ($MgCl_2$), sodium sulfate ($Na_2SO_4$), magnesium sulfate ($MgSO_4$), $NaHCO_3$ and combinations of the same.

As used herein, "in situ reservoir conditions" can refer to elevated pressure and temperature conditions, rock mineralogical compositions, and fluid compositions locally existing in the reservoir.

As used herein, "viscous oil" or "viscous crude oil" refers to in-situ reservoir crude oil having a viscosity of greater than about 2 and less than 100 cP at in-situ reservoir conditions.

As used herein, "heavy oil" refers to crude oil of less than 22.3° API gravity or more than 100 cP viscosity at in-situ reservoir conditions.

As used herein, "incremental oil recovery" refers to an increase in oil recovery in terms of percent original oil in place over any base case, or conventional recovery process as a regular water flood.

As used herein, "the pore scale" refers to the scale corresponding to the pore size range of the pore space of the in-situ rock, typically on the order of a 2-5 microns.

As used herein, "microscopic sweep efficiency" refers to sweep efficiency of displacing fluid at the pore scale. Microscopic sweep efficiency is a measure of how effectively the injection fluid mobilizes and displaces oil from the pores in the reservoir rock.

As used herein, "macroscopic sweep efficiency" or "volumetric sweep efficiency" refers to sweep efficiency of displacing fluid at the reservoir scale. Macroscopic sweep efficiency is a measure of how effectively the displacing fluid contacts the volume of a reservoir both areally and vertically.

As used herein, "synergy" refers to the additive effect of the favorable interaction of a secondary recovery process (such as smart water) to improve the performance and economics of a primary recovery process (such as polymer) without losing the individual recovery benefit of two processes when combined.

As used herein, "carbonate reservoirs" refers to a sedimentary rock condition deposited in a marine environment and mostly made up of calcium carbonate. Carbonate reservoirs are chemically active and can undergo a range of physical and chemical processes known as diagenesis. Diagenesis alters the rock structure to show large abrupt variations in rock properties such as porosity.

As used herein, "polymer flooding" refers to the use of viscosified injection waters to reduce the mobility of injection water for better reservoir contact. A polymer flooding differs from a water flooding process in that water flooding processes use plain water such as seawater for injection into reservoirs to provide some pressure support and physically displace oil from the injection wells to the producing wells.

As used herein, "total dissolved solids" or "TDS" refers to the sum of the combined amount of all inorganic salts contained in the injection water in the form of charged ions, such as monovalent ions and divalent ions. TDS can also be considered a measure of the salinity of a smart water.

A composition for a polymer flooding process involving viscous oil recovery in carbonate reservoir formations with in situ rock is herein provided. The composition is a smart water/polymer composition. The composition can include a smart water and a polymer.

The composition of the smart water can be selected based on the carbonate reservoir formation. In at least one embodiment, the smart water compositions of the present invention are not suitable for sandstone reservoirs. Sandstone reservoirs require injection fluids enriched in monovalent ions with lower concentrations of divalent ions.

The polymer can be any polymer capable of increasing the viscosity of the smart water. Examples of polymer suitable for use in the present invention include copolymers of acrylamide and acrylate and copolymers of acrylamide and acrylamido tertiary butyl sulfonate (ATBS). Advantageously, copolymers of acrylamide and ATBS can tolerate reservoir temperatures up to 95° C. as in the prevailing carbonate reservoirs. In at least one embodiment, the copolymer of acrylamide and acrylate can be from the standard Flopaam™ series polymers from SNF Floerger, France. In at least one embodiment, the copolymer of acrylamide and ATBS can be from the Flopaam™ AN series of polymers from SNF Floerger, France.

The polymer can be added to the smart water at concentrations in the range from 0.05 to 0.30 weight percent (wt %) (500 ppm by weight to 3000 ppm by weight), alternately in the range from 0.1 wt % (1000 ppm) to 0.3 wt % (3000 ppm), alternately in the range from 0.1 wt % to 0.2 wt %, alternately in the range from 0.1 wt % to 0.15 wt %, and alternately in the range from 0.15 wt % to 0.2 wt % to produce the smart water/polymer composition. In at least one embodiment, the polymer concentration in the smart water/polymer composition is in the range from 1000 ppm to 3000 ppm. In at least one embodiment, the polymer concentration in the smart water/polymer composition is in the range from 1000 ppm to 2000 ppm. The injection smart water is used as the makeup water to dissolve the polymer and carry the polymer into the carbonate reservoir formation. The smart water/polymer composition can alter a wettability of the in situ rock in the carbonate reservoir formation with improved mobility control. When the rock wettability is altered towards a more favorable intermediate-wet or water-wet state, it reduces capillary trapping of residual oil to release more oil from pores. In other words, the alteration of rock wettability advantageously improves microscopic sweep efficiency. The increased viscosity of smart water due to polymer addition will also increase the reservoir contact, both vertical contact and areal contact, of the injection fluid to mobilize the remaining oil. In other words, the viscosity of smart water due to the presence of the polymer improves macroscopic sweep efficiency as compared to a smart water in the absence of polymer. The enhancements in both microscopic sweep efficiency and macroscopic sweep efficiency can result in a higher incremental oil recovery as compared to an injection fluid that does not have improved efficiencies.

The smart water/polymer composition is in the absence of additives. Additives can include, but are not limited to, viscosifiers, surfactants, stabilizers, pH control agents, scale inhibitors. In at least one embodiment, the smart water/polymer compositions include only water, divalent ions, monovalent ions and polymer.

A polymer flooding process for use in viscous oil recovery in carbonate reservoirs is provided. The polymer flooding process of the present invention can be used in any carbonate reservoir containing oil to be recovered. The oil to be recovered can include viscous oil and heavy oil. In at least one embodiment, the polymer flooding process of the present invention uses the smart water/polymer composition to recover viscous oil. In at least one embodiment, polymer flooding process is limited to use in carbonate reservoirs.

The concentration of polymer in a smart water/polymer composition can be chosen based on the desired viscosity and to achieve water-oil mobility ratio for the specific viscous oil of interest in a carbonate reservoir.

The "mobility ratio" as used herein refers to the ratio of mobility of injection fluid (such as water) to that of the displaced fluid (such as crude oil). Mobility is defined as the ratio of effective permeability to viscosity. The effective permeability can be determined at the water saturation ahead of the displacement front for oil while at the water saturation behind the displacement front for injection fluid. Typically, a mobility ratio of less than or equal to one is preferred to provide piston like displacement and avoid viscous fingering.

In at least one embodiment, the polymer flooding process for use in oil recovery can include in a first step, injecting an initial slug of the smart water/polymer composition into a carbonate reservoir formation, the volume of the initial slug of the smart water polymer composition can be at least 0.3 pore volumes (PV). As used herein, "pore volume" refers to a unit of measure for void space available in the reservoir rock material. In a second step, a continuous of injection of smart water is injected into the carbonate reservoir formation.

In an alternate embodiment, the polymer flooding process for use in oil recovery can include in a first step of injecting a smart water/polymer slug into a carbonate reservoir formation, the volume of the smart water polymer slug can be at least 0.3 PV. In a second step, a smart water slug can be injected into the carbonate reservoir formation, the volume of the smart water slug can be at least 0.5 PV. In a final step the polymer flooding process can include a continuous injection of seawater chase. As used herein, "seawater chase" refers to the use of seawater as a chase fluid.

In an alternate embodiment, the polymer flooding process for use in oil recovery can include in a first step of injecting a smart water/polymer slug into a carbonate reservoir formation, the volume of the smart water polymer slug can be at least 0.3 PV. In a second step, one or more tapered smart water/polymer slugs can be injected into the carbonate reservoir formation, the cumulative volume of all such tapered smart water/polymer slugs can be at least 0.2 PV. "Tapered" as used herein refers to successively reducing the polymer concentration from an initial maximum value to zero. By way of example, if the smart water/polymer slug in the first step is at a concentration of 3000 ppm, the tapered smart water/polymer slugs can follow the concentration as shown in Table 2.

TABLE 2

Example of polymer concentration in tapered smart water/polymer slugs

| Tapered smart water/polymer slug # | Polymer concentration |
| --- | --- |
| Tapered smart water/polymer slug 1 | 2500 ppm |
| Tapered smart water/polymer slug 2 | 2000 ppm |
| Tapered smart water/polymer slug 3 | 1500 ppm |
| Tapered smart water/polymer slug 4 | 1000 ppm |
| Tapered smart water/polymer slug 5 | 500 ppm |
| Tapered smart water/polymer slug 6 | 0 ppm |

In a final step following the one or more tapered smart water/polymer slugs, the polymer flooding process can include a continuous injection of a seawater chase.

The present invention advantageously provide methods and compositions for recovering heavy oil and viscous oil from carbonate reservoir formations.

EXAMPLES

Example 1

Example 1 is a comparison study of rheology data on a high salinity water (HSW)/polymer composition and a smart water/polymer composition conducted at different temperatures. A copolymer of acrylamide and ATBS was used as the polymer. The copolymer of acrylamide and ATBS was a sulfonated polyacrylamide, AN-125, from SNF Floerger, France. The copolymer of acyrlamide and ATBS had a molecular weight of 12 million Dalton, a polyacrylamide hydrolysis degree of 5%, and contained a polymer content of 25% ATBS and 75% acrylamide. The HSW was prepared to have a TDS of about 69,000 ppm containing 55,786 mg/L of NaCl; 10,654 mg/L of $CaCl_2.2H_2O$; 4,483 mg/L of $MgCl_2.6H_2O$; 2,610 mg/L of $Na_2SO_4$; and 503.9 mg/L $NaHCO_3$. The smart water was prepared to have a TDS of about 6,900 ppm, making it a 10-times diluted version of the HSW containing 5,578.6 mg/L of NaCl; 1,065.4 mg/L of $CaCl_2.2H_2O$; 448.3 mg/L of $MgCl_2.6H_2O$; 261 mg/L of $Na_2SO_4$; and 50.39 mg/L $NaHCO_3$.

The HSW/polymer composition and the smart water/polymer composition were prepared by dissolving powdered polymer in the respective fluid. The HSW/polymer composition contained 0.3 wt % copolymer of acrylamide and ATBS. The smart water/polymer composition contained 0.2 wt % copolymer of acrylamide and ATBS. Polymer viscosity of each composition was measured at three temperatures, 25° C., 40° C., and 60° C. using a MCR 301 Rheometer from Anton Paar. The MCR 301 is based on cone and plate geometry and can generate viscosity curves of polymer solutions at shear sweeps ranging from 0.1 $sec^{-1}$ to 1000 $sec^{-1}$. The polymer viscosities were determined at a specific shear rate of 6.81 $sec^{-1}$.

Table 3 contains the data from the study. FIG. 1 graphs viscosity of the composition versus temperature for the two compositions.

TABLE 3

Polymer solution viscosities as a function of temperature in two different makeup waters

| Temperature (° C.) | Viscosity with 0.3 wt % polymer in HSW (cP) | Viscosity with 0.2 wt % polymer in smart water (cP) |
| --- | --- | --- |
| 25 | 27.6 | 24.9 |
| 40 | 20.2 | 20.5 |
| 60 | 14.9 | 14.7 |
| 99* | 10.6* | 11.2* |

*The viscosity data at a reservoir temperature of 99° C. was obtained by the extrapolation of the measured data at the other three temperatures.

The data in Table 3 and in FIG. 1 shows that a smart water/polymer composition with a polymer concentration of 2000 ppm by weight exhibits almost the same viscosities as a HSW/polymer composition with a polymer concentration of 3000 ppm. This illustrates that a smart water/polymer composition requires less polymer than a high salinity water to achieve the same target viscosity. In this example, the polymer consumption of a process using a smart water/polymer composition would be 33% (⅓) less than the polymer consumption of an HSW/polymer composition.

Example 2

Example 2 describes a reservoir condition core flood study using the same HSW and smart water compositions of Example 1. A carbonate reservoir core sample having a permeability of 2.0 Darcy was fully saturated with brine first and then a viscous crude oil having a viscosity of 4.5 cP was injected into the core to establish initial water saturation. The carbonate reservoir core sample was then submerged in the viscous crude oil and aged for four weeks. After four weeks, the carbonate reservoir core sample was loaded into a coreflooding system and then the oil displacement tests were conducted at reservoir conditions.

Figure 2:
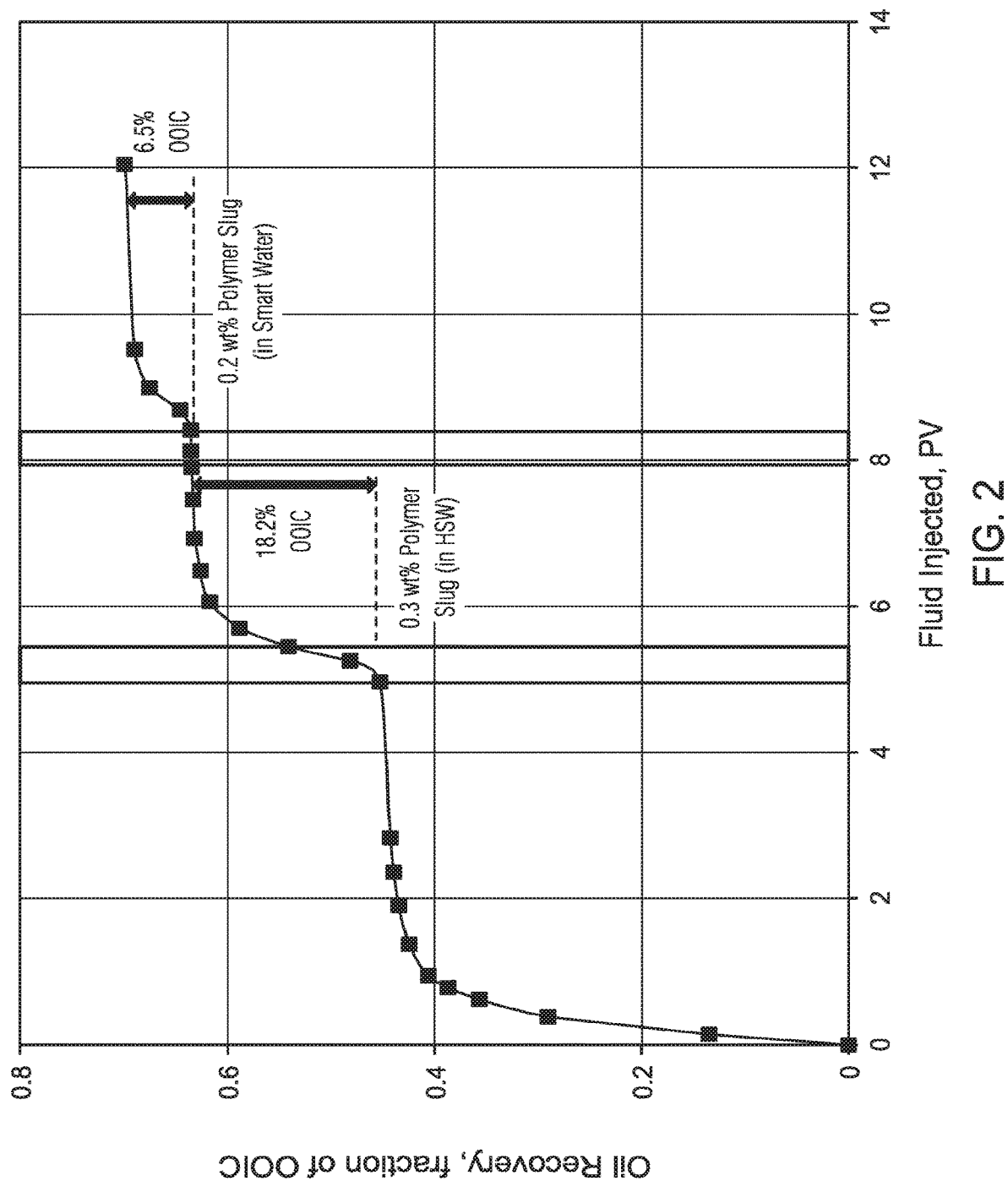
FIG. 2 is a graphical representation of the EOR Oil Recovery versus pore volumes injected from core flood study in Example 2.

In a first step of the oil displacement tests, oil was displaced by the injection of a high salinity water, in the absence of polymer with a composition as described in Example 1. In a second step, a HSW/polymer slug of 0.3 wt % polymer in HSW was injected. Finally, a smart water/ polymer slug of 0.2 wt % polymer in smart water was injected. The oil recovery data in terms of fraction original oil in core (OOIC) obtained during these different flooding stages are summarized in Table 4 and in FIG. 2.

TABLE 4

Summary of Oil Recoveries from Core Flood Study

| Injection Fluid | Oil Recovery (fraction OOIC) | |
|---|---|---|
| | Incremental | Cumulative |
| HSW | 0.453 | 0.453 |
| HSW/polymer composition | 0.182 | 0.635 |
| Smart water/polymer composition | 0.065 | 0.700 |

As can be seen from these data, the tertiary polymer flood with the HSW/polymer composition was able to recover 18.2% incremental oil over the secondary HSW flood. The post tertiary polymer flood with the smart water/polymer composition was able to add an additional 6.5% incremental oil, which can be considered as the individual contribution from the smart water.

By combining the results from both of these stages, it can be concluded that the incremental oil recovery from the tertiary smart water/polymer composition polymer flooding should be about 25%, which is about 6-7% higher than the incremental oil recovery from the HSW/polymer composition polymer flooding. This higher incremental oil recovery is due to the combined additive effect of smart water with polymer.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

The invention claimed is:

1. A composition for use in a polymer flooding operation in a viscous oil containing carbonate reservoir formation with in situ rock, the composition comprising:
   a polymer, the polymer operable to increase the viscosity of the composition; and
   a smart water, the smart water operable to alter a wettability of the in situ rock,
      wherein the smart water has a total dissolved solids of between 5,000 ppm and 7,000 ppm,
      wherein the total dissolved solids comprises a salt, where the salts comprise a combination of sulfate, calcium, and magnesium ions, wherein the smart water comprises 300 ppm or less of divalent cations, wherein the smart water comprises 400 ppm or greater sulfates,
   wherein the composition has a viscosity between 4 cP and 100 cP, wherein the composition is in the absence of a surfactant, wherein the polymer is selected from the group consisting of a copolymer of acrylamide and acrylate and a copolymer of acrylamide and acrylamide tertiary butyl sulfonate (ATBS).

2. The composition of claim 1, wherein the polymer comprises a copolymer of acrylamide and acrylate.

3. The composition of claim 1, wherein the polymer comprises a copolymer of acrylamide and acrylamide tertiary butyl sulfonate (ATBS).

4. The composition of claim 1, wherein the salt can be selected from the group consisting of sodium chloride, calcium chloride, magnesium chloride, sodium sulfate, magnesium sulfate, sodium bicarbonate, and combinations thereof.

5. The composition of claim 1, wherein the polymer is present in an amount between 1,000 ppm by weight and 3,000 ppm by weight.

\* \* \* \* \*